(12) United States Patent
Maekawa et al.

(10) Patent No.: US 6,712,947 B1
(45) Date of Patent: Mar. 30, 2004

(54) WATER PURIFYING APPARATUS WITH ELECTRIC FIELD GENERATOR

(75) Inventors: Takaaki Maekawa, Ibaraki (JP); Kazuo Fujita, Ibaraki (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/719,854

(22) PCT Filed: Apr. 19, 2000

(86) PCT No.: PCT/JP00/02541

§ 371 (c)(1),
(2), (4) Date: Feb. 20, 2001

(87) PCT Pub. No.: WO00/63123

PCT Pub. Date: Oct. 26, 2000

(30) Foreign Application Priority Data

Apr. 19, 1999 (JP) .......................................... 11/110911

(51) Int. Cl.[7] .................................................. C02F 1/46
(52) U.S. Cl. .................... 204/555; 204/225; 204/228.3; 204/228.6; 204/554; 204/571; 204/660; 204/661; 204/668; 205/742; 205/743
(58) Field of Search .............................. 204/225, 228.3, 204/228.6, 554, 555, 571, 660, 661, 668, 573; 205/743

(56) References Cited

U.S. PATENT DOCUMENTS

| | | | | | |
|---|---|---|---|---|---|
| 4,808,304 A | * | 2/1989 | Deal | .......................... | 210/170 |
| 5,569,809 A | * | 10/1996 | Gui | .............................. | 588/204 |
| 5,730,856 A | * | 3/1998 | Omasa | ........................ | 205/742 |
| 5,772,859 A | * | 6/1998 | Guerini | ....................... | 204/228 |

* cited by examiner

Primary Examiner—Roy King
Assistant Examiner—William T. Leader
(74) Attorney, Agent, or Firm—Wenderoth, Lind & Ponack, L.L.P.

(57) ABSTRACT

A purifying apparatus for purifying flowing water includes a negative electrode plate disposed on a flowing water bed and a positive electrode plate disposed at an upper face opposite to the negative electrode plate, wherein the positive electrode plate is adapted to be dipped below a water surface of the flowing water with floats being disposed at least at upstream and downstream end portions or opposing side portions of the positive electrode plate in a flowing direction of the flowing water. A structure is provided for positioning the positive electrode plate at a position opposite the negative electrode plate. Also, as necessary, a vertical-movement structure is provided to allow vertical movement of the positive electrode plate and of a gas collecting unit. The positive electrode plate and the negative electrode plate are provided with an electric field generator.

14 Claims, 5 Drawing Sheets

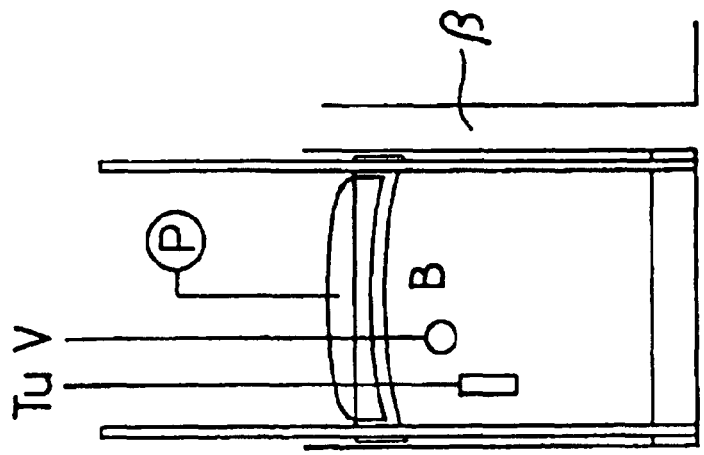
F I G. 1(b)
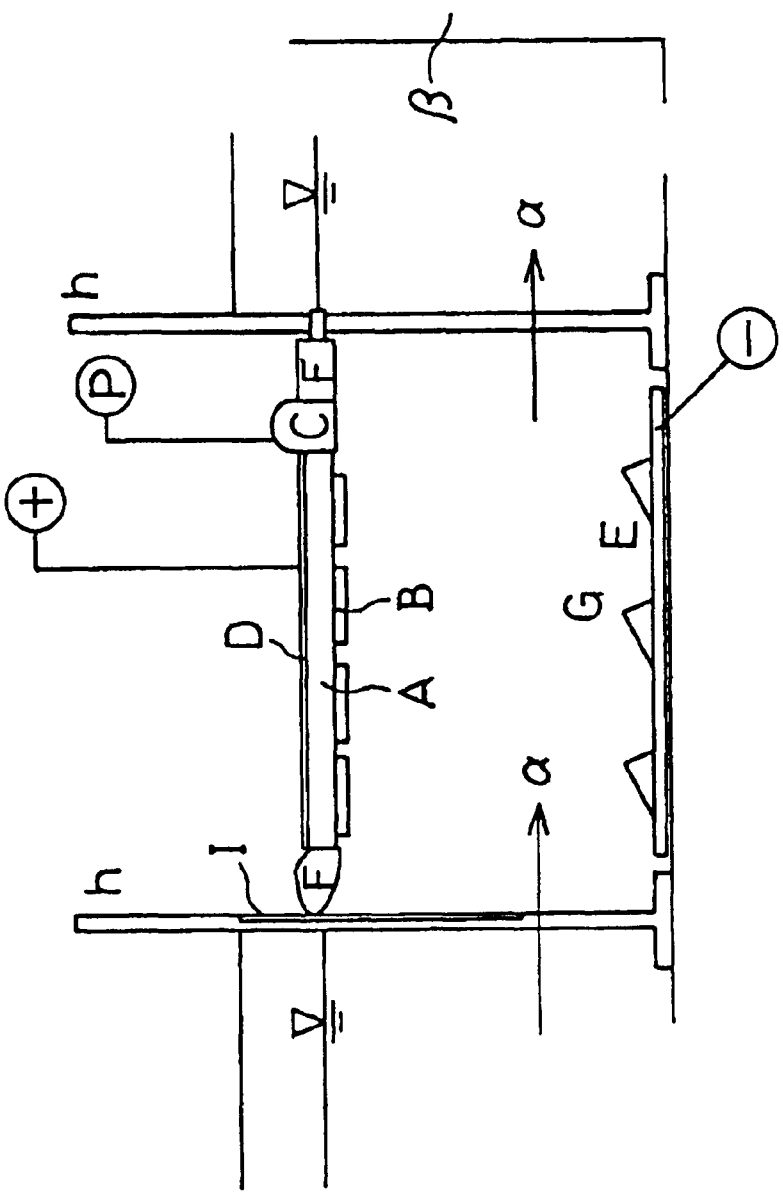
F I G. 1(a)

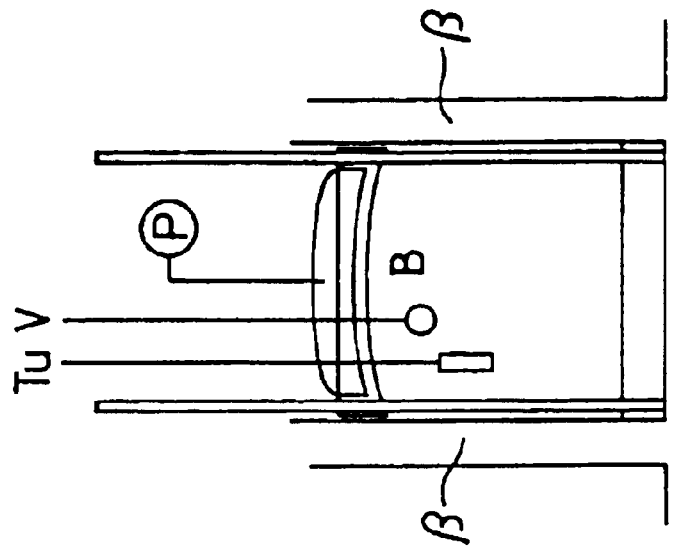
F I G. 2(b)
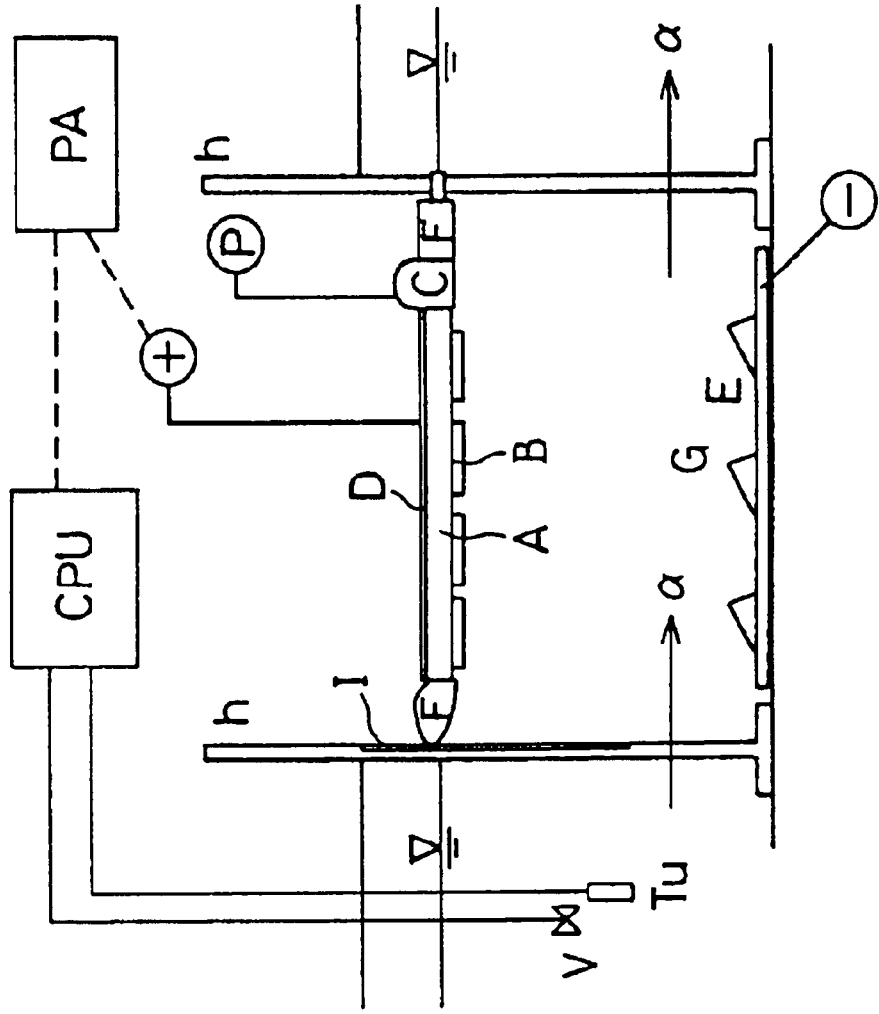
F I G. 2(a)

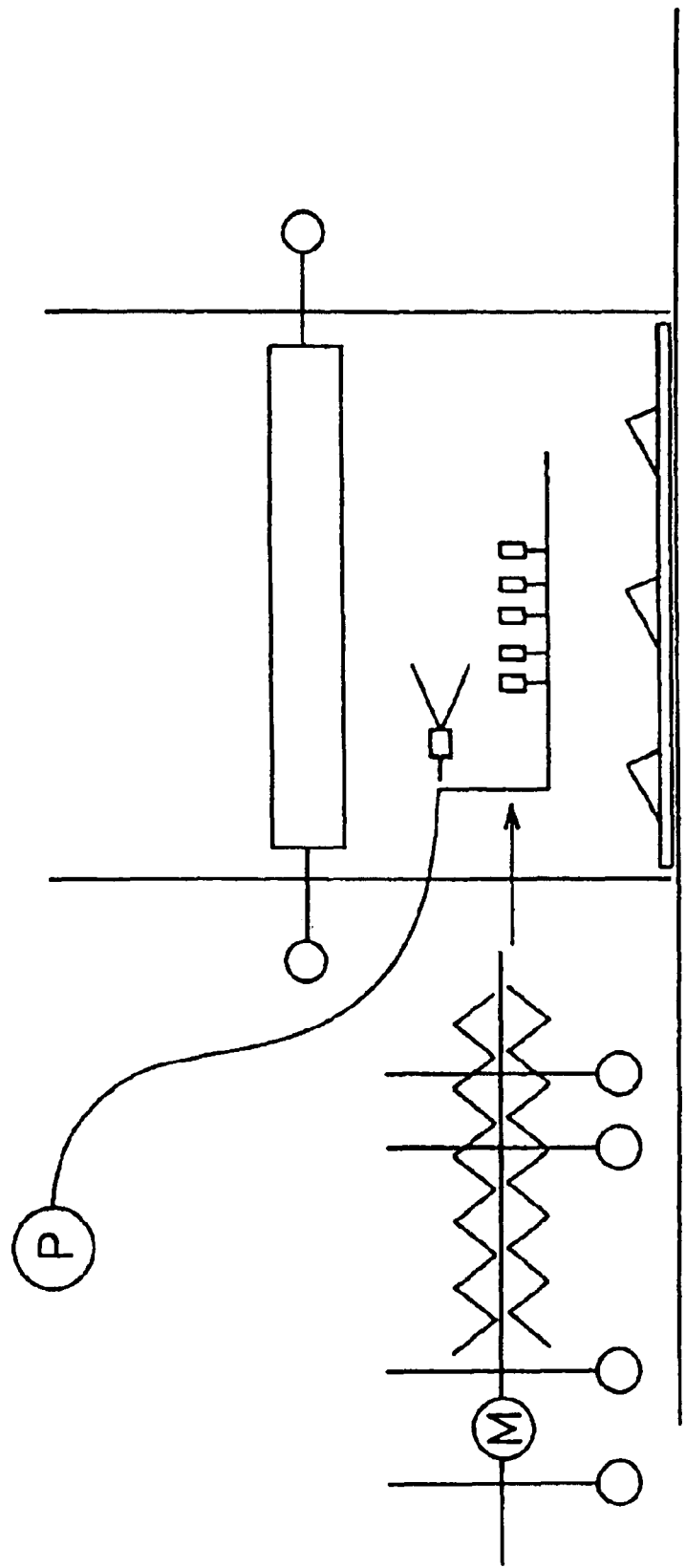

OXIDIZING/DECOMPOSING UNIT

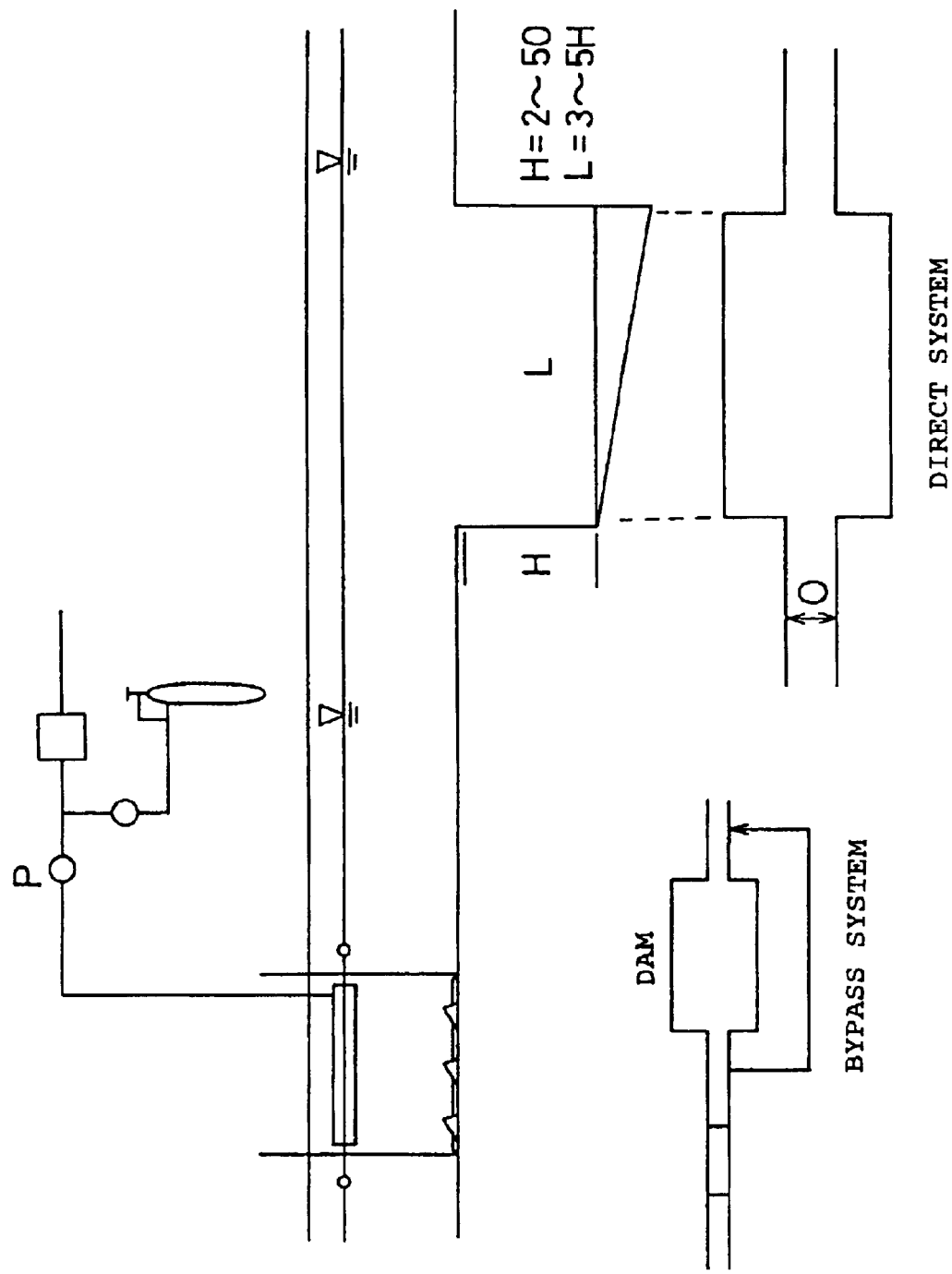

WATER PURIFYING APPARATUS WITH ELECTRIC FIELD GENERATOR

BACKGROUND OF THE INVENTION

1. Field of the Invention

The present invention relates to a purifying apparatus for flowing water. In more detail, the invention relates to a purifying apparatus that operates by oxidation and decomposition of water pollution substances in a river, which is effective for use such as elimination of nitrogen and phosphorous which are substances that cause eutrophication of the flowing river water.

2. Description of the Related Art

Hitherto, in regard to a purification of the water pollution substances in the river, although a contact oxidation method by a biological membrane having a membrane in which microbes living in the river naturally grow has been developed and applied, this method is suitable mainly to purify carbon sources contained in waste water, but it is not suitable to eliminate nitrogen and phosphorous which are substances that cause eutrophication.

Therefore, in the prior art, in order to prevent the eutrophication it has been necessary to decompose and eliminate nitrogen and phosphorous other than the carbon sources, so that the biological membrane treatment method is not necessarily sufficient. Further, there have been studied countermeasures such as a nitrification/denitrification by a nutrient salt inclusive fixing method in which the biological membrane has been strengthened and about application of an ammonia phosphate crystallizing method using Mg salt, but they have such serious shortcomings that an elimination rate of nitrogen cannot exceed 60% in a case where the ammonia in the river is eliminated, that a sufficient elimination rate cannot be ensured depending on a C/N ratio, and that even if dissolved oxygen is sufficiently ensured in the river flow the nitrification does not proceed because a reaction velocity of nitrifying bacteria is low for the nitrification of ammonia for a nitrogen. Accordingly, means for increasing the elimination rate of nitrogen and phosphorous to 90% or higher has become necessary at any cost.

SUMMARY OF THE INVENTION

Therefore, an object of the invention is to provide a now purifying apparatus capable of effectively eliminating the water pollution substances such as nitrogen and phosphorous in the flowing water in the river and the like, thereby solving the problems mentioned above of the prior art.

As one means for achieving the above object the invention provides a purifying apparatus for flowing water in which a negative electrode plate is disposed on a flowing water bed and a positive electrode plate is disposed in an upper face opposite to the negative electrode plate, characterized in that the positive electrode plate is adapted so as to be dipped below a water surface of the flowing water with floats being disposed at least at the front/back (i.e. upstream/downstream ends) or left/right (i.e. opposing sides) of the positive electrode plate in a flowing direction of the flowing water, in the positive electrode plate there is arranged means for disposing it to an opposed upper face position with respect to the negative electrode plate, and the positive electrode plate and the negative electrode plate are provided with an electric field generator so that water pollution substances contained in the flowing water are oxidized and decomposed by a generation of high electric field pulses.

The invention intends to solve the problems by means of generating O-radical (oxygen radical) and OH-radical (hydroxy radical), which are generated by the high electric field pulses and have a high oxidizing power, on a metal face for nanosecond to microsecond, oxidizing mainly a carbon source and a nitrogen source in a polluted water, which impinge against these radicals, and cohering phosphorous by a cohesive reaction of particles in accompaniment with an electrification of $H^+$ ions generated on this occasion to floating suspended substances so as to deposit as sediment and separate the phosphorous, thereby achieving by one pass operation an elimination of the pollution substances at 90–95% which could not be attained by the prior art.

And, in a concrete implementation mode, since a water level and a flow rate of the flowing water change together with a structure of the purifying apparatus, in order to cope with this, the fact is taken into consideration that it is necessary to automatically control a supplied watt-hour by the flow rate of the water and a concentration of SS such that it becomes a suitable optimum watt-hour to thereby maintain the elimination rate of the pollution substances constant. For example, since the flowing water in a river greatly changes depending on time during one day and a ratio between when the flow rate is minimum and when it is maximum reaches 1:10–20, it follows that a magnitude of the flow rate is proportional to a passing velocity, so that, in order to supply an electric power tracing the magnitude of the flow rate, it is necessary to adjunctively provide a control unit for adjusting the supplied watt-hour which is optimum and minimum with respect to the flow rate, the floating suspended substances and a water depth. Further, in an emergency time such as a flood, the present apparatus must be provided for being shunted so as not to become an obstacle in the flowing water.

Therefore, first, in a structure of the purifying apparatus of the invention, the following modes are taken into consideration as being suitable ones, although not limited to these.

<1> In the positive electrode plate, there is provided means for vertically moving it.

<2> Gas collecting means (for collecting a gas generated by oxidation and decomposition) is provided.

<3> The positive electrode plate has at least one positive electrode substance among metals (including alloys; hereafter, ditto) and metal oxides.

<4> The positive electrode plate is composed, for example, of a base plate which is metal, ceramics or resin or a composite body of more than two of the formers, and of the positive electrode substance.

<5> The positive electrode substance is at least one of, for example, titanium oxide, ruthenium oxide, cobalt oxide, nickel oxide, tin oxide and platinum.

<6> In a more concrete example, in the positive electrode plate, at least one of titanium oxide, ruthenium oxide, cobalt oxide, nickel oxide, tin oxide and platinum is integrated with a plate of porous titanium, porous ceramics or stainless.

<7> The positive electrode plate is adapted such that its dipped depth from a water surface is $1/5$–$1/10$ of a water depth.

In the invention adapted such that the water pollution substances contained in the flowing water are oxidized and decomposed by the generation of high electric field pulses, how the positive electrode plate should be constituted is practically a very important point in order to make the generation of high electric field pulses and actions of the aforesaid radicals by the generation effective ones. More suitably, in the invention, as the positive electrode substance, the metal oxide or a noble metal is used. Such a metal oxide called titanium oxide, ruthenium oxide, cobalt oxide, nickel oxide or tin oxide, or platinum as mentioned above is effective.

As to the positive electrode substance, in a case where it is the metal oxide, it maybe one formed by making its particles into a green compact and baking or sintering it, or one in which the substance or its particles is/are born on a suitable base plate. As the base plate for bearing on this occasion, it may be, for example, a plate of porous titanium, porous ceramics or stainless etc., which has a high corrosion resistance, and it is preferable that the positive electrode substance constitutes a positive electrode face portion in a membrane-like form. The base plate itself way be made conductive, or the positive electrode substance in the membrane-like form may be caused to have a conductive property.

The metal oxide may be integrated with the base plate by an adhesion-integration by deposition, distillation and the like, or means such as application of a gel solution.

In case of platinum, a surface plating may be adopted, or a platinum foil may be adhered.

Incidentally, as to a negative electrode, various substances may be adopted so long as they are metals having a high corrosion resistance or ones whose surfaces are coated with the metals. For example, a stainless plate and a metal plate coated with the platinum foil are exemplified.

It is practical that the positive electrode is adapted to be dipped from the water surface by vertically moving means and, further, it is desirable that the positive electrode plate is provided in its vicinity with gas collecting means.

Further, it is preferable in the invention that the positive electrode plate has a concave curved face opposite to the negative electrode in viewpoints of generating the high electric field pulses and collecting a decomposed gas.

Concretely exemplifying and explaining, for example, in the purification apparatus by oxidation and decomposition of the invention, the stainless plate or the metal plate coated with the platinum foil is made the negative electrode; titanium oxide, ruthenium oxide, cobalt oxide, nickel oxide, tin oxide or the platinum foil is adhered to an upper face of die-cast plate etc. of conductive porous titanium or stainless parallel in face to the metal plate; one in which the aforesaid upper face is slightly curved in a concave state relative to the negative electrode is made the positive electrode plate; floats are attached to the positive electrode plate at its front and back; there is provided a structure in which the positive electrode plate is dipped to 1/5–1/10 of a water depth; and there is provided a structure in which the floats are vertically movable at four corners of the positive electrode plate. Further, a sealant is applied in order to prevent a gas generated by the decomposition form escaping, and a gas reservoir is provided, thereby making it possible to collect the generated gas.

And, it is preferable that the purifying apparatus of the invention is adapted such that the water flow impinges against an oxidizing electrode face (positive electrode plate) under a turbulent flow state by high electrode field-pulse waves, and an oxidizing reaction of pollution substances continues for at least 2–3 seconds. Further, as mentioned above, it is desirable to prevent the gas generated by oxidation and decomposition from being discharged into the air. Since the oxidizing reaction occurs by a physicochemical reaction, $N_2$ and $NOx$ are generated in regard to N source, noxious gasses of $SOx$ and $H_2S$ are generated in regard to S source, and $CO_2$ gas is mostly generated and CO gas is slightly generated in regard to C source. It is desirable that these intermediate products are reduction-treated by hydrogen and the like. Treating means and a treating unit therefor are also proposed in the invention.

BRIEF DESCRIPTION OF THE DRAWINGS

FIG. 1a is a side sectional view showing a constitution of a purifying apparatus of the invention;

FIG. 1b is a front sectional view showing the same;

FIG. 2a is a side sectional view showing an example having an electric field control mechanism;

FIG. 2b is a front sectional view showing the same;

FIG. 3 is a side sectional view showing an example having a cleaner mechanism;

FIG. 5 is a constitutional view showing an example having a sediment collecting unit.

DETAILED DESCRIPTION OF THE PREFERRED EMBODIMENTS

Figure 4:
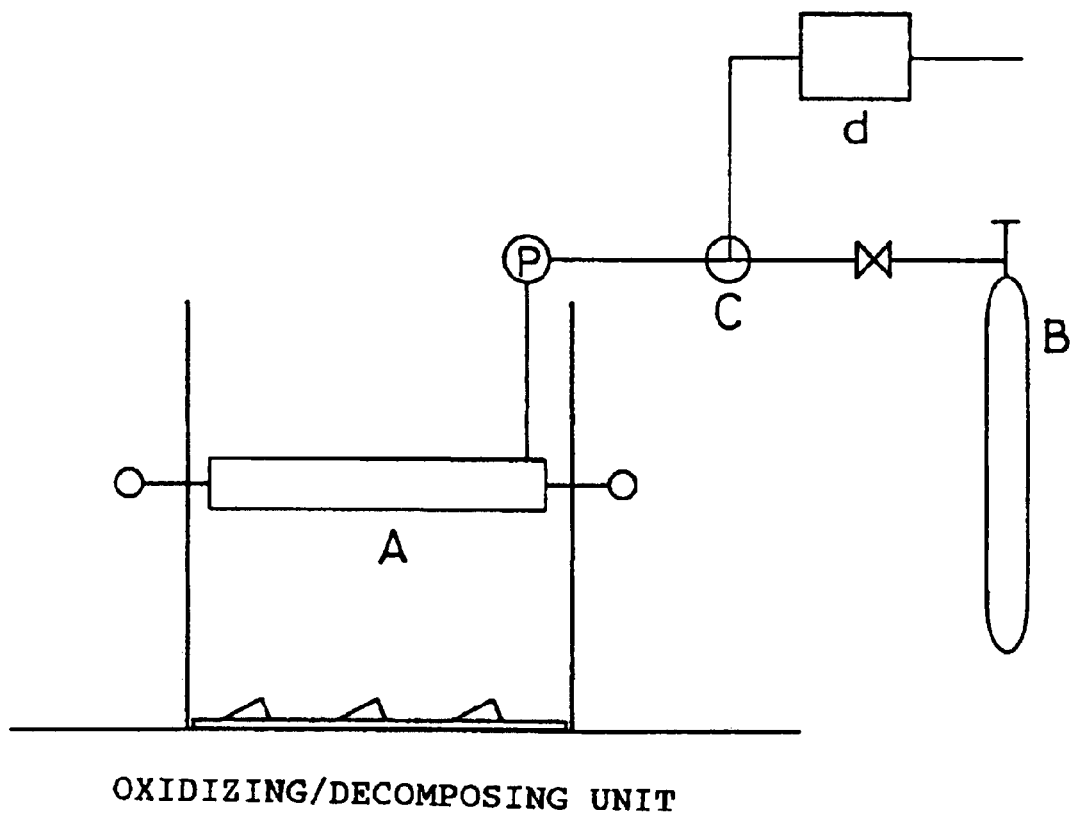
FIG. 4 is a constitutional view showing an example having a gas catalyst oxidation unit.

Next, it is further explained about an implementation mode of the invention with reference to the drawings. First, FIG. 1a is a lateral sectional view showing main portions of a constitution of the purifying apparatus of the invention, and FIG. 1b a front sectional view showing the same. A positive electrode plate is constituted as one in which a conductive porous metal (A) such as titanium for instance is made a base plate and to which there is integrally applied an oxide electrode or a platinum electrode (B), which consists of an oxide such as titanium oxide, ruthenium oxide, cobalt oxide, nickel oxide or tin oxide or platinum. Plural electrodes (B) are disposed orthogonally to a flowing direction (α) of the flowing water.

The positive electrode mentioned above is adapted such that it floats due to the presence of air floats (F) utilizing buoyancies of air reservoirs disposed upstream and downstream in the flowing direction (α), and moves up and down by movable crowns (h).

The movable crown (h) is adapted such that its position is detected by a differential transformer (I).

And, in the example of FIG. 1, there is adopted a structure in which a seal plate (D) as means for creating a gas seal is integrally arranged on a back face of the porous metal (A) as the base plate constituting the positive electrode plate, a gas reservoir (C) is mounted at a downstream side of the positive electrode, and a gas generated in a surface of the electrode (B) is collected into the gas reservoir (C) directly or after entering into the porous metal (A) and discharged by a gas collecting pump (P). As shown in FIG. 1b, the electrode (B) has a concave shape in section, thereby making it possible to easily collect the generated gas. Further, a turbulent flow generating plate (G) is placed on a surface of a negative electrode plate (E) in order to maintain the turbulent flow, and thus it is adapted such that an oxidation/decomposition efficiency is enhanced by making it easy to generate the turbulent flow.

And, by the differential transformer provided in the movable crowns (h) as vertically moving means, it is adapted such that a voltage between the positive electrode plate and the negative electrode plate is changed between 200 V/cm and 10 KV/cm. Further, a turbidimeter (Tu) as a concentration detector is provided in front of the flow, and an electric current is changed between 1 mA and 100 mA in compliance with the concentration. Further, a flow velocity meter (V) is arranged in a similar manner and, from the flow velocity, a frequency is changed between 10 kHz and 150 kHz. By such an automatic control mechanism, it follows that the oxidation and decomposition complying with a load amount of the water pollution is effectively performed. As to the automatic control mechanism, it is possible to further exemplify.

For example, like FIG. 2a and FIG. 2b, it is adapted such that positions of plus and minus are detected by the differential transformer (I), the flow rate is detected by the flow velocity meter (V), an SS amount is detected by the turbidimeter (Tu), a control unit (CPU) and an electric field generating unit (PA) are used, and these are made possible to perform controls of a voltage, a frequency, a pulse timing and a duty ratio by digital controls always as an optimum electric field treatment.

For example, in such examples of the invention as mentioned above, as shown also in FIG. 1b and FIG. 2b, the purifying apparatus is disposed within a width between side walls ($\beta$) such as concrete. It is practically desirable to dispose it in this manner.

And, in the oxidation/decomposition purifying apparatus of the invention, like FIGS. 1a and 1b and FIGS. 2a and 2b, as a suitable one there is shown one having a structure in which plural turbulent flow generating plates (G) each having a metal protrusion are placed on the negative electrode plate (E) such that the water flow forms the turbulent flow with its height being limited to 10–15% of a distance between the electrode plates.

It is considered to make a backward angle of the protrusion about 20–40 degrees, and to dispose about 2–10 protrusions in the flowing direction of the water flow.

Further, in the river, since it is considered that suspended substances (SS) such as sand and gravel enter into the apparatus, and in order to prevent an electrode face from deteriorating by the fact that the SS concentration is high, it is preferable, like FIG. 3, to periodically perform a cleaning of the electrode face by a brush and a water jet by means of an automatic control. Further, during a flood, since an outflow becomes larger than a planned water amount, it is effective to apply a provision for drawing up the plus electrode from an in side of the water, thereby immediately stopping loads of pulse waves.

Furthermore, in order to decompose a noxious gas such as NOx, SOx and H2S, like FIG. 4, it is possible to reduce the gas by means of a catalyst (d) by mixing the gas in a gas mixing unit (C) with hydrogen generated by an electrolysis of the water or hydrogen supplied from an H2 bomb (B), thereby intending to prevent the noxious gas from generating.

As a countermeasure during the flood, it is desirable that, when the electrode has floated above a set water level as shown in FIGS. 1a and 1b, the electrode is lifted above the water surface by an electric motor to thereby maintain safety of the apparatus.

And, further, the SS is deposited as sediment by, for example, a high electromagnetic treatment, and the phosphorous and the SS in the polluted water can be eliminated in a range of 80–90% by means of gravity-sedimentation by providing in a downstream side a sedimentation tank through a bypass system by a pump or a direct system and returning a supernatant liquid to the original river (FIG. 5).

Now, hereunder, the invention is explained in more detail by reference to particular embodiments.

<Embodiment 1>

In a U-shape groove of 0.5×0.5×0.5 m, side grooves of 1–20 L/min in the flow rate of a domestic waste water of about 200 households were treated by the purifying apparatus of the invention exemplified in. FIGS. 2a, 2b and FIG. 4. Qualities of the original water and the treated water are as shown in. Table 1.

TABLE 1

|  | Original water | Treated water |
|---|---|---|
| $COD_{CT}$ | 45–50 | 1–2 |
| T—N | 20–30 | 2–3 |
| $NH_3$—N | 18–25 | 1–2 |
| $NO_3$—N | 3–5 | 0.1–0.2 |
| T—P | 3–5 | 0.1–0.2 |
| SS | 40–45 | 5–10 | unit:mg/l

Operating conditions are as shown in Table 2.

TABLE 2

| Voltage | 4 kV–10 kV |
|---|---|
| Electric current | 2–10 mA |
| Frequency | 50–75 kHz |
| Water depth* | 10 cm |
| Electrode (plus) | Titanium oxide (porous titanium base plate) |
| Electrode (minus) | SUS (stainless plate) |

*Dammed

Further, concentrations of the generated gasses are as shown in Table 3, and the gas after having been catalyst-treated by means of nickel and copper by a hydrogen addition was decreased in its noxious gasses, and their contents were in the order of traces.

TABLE 3

|  | Generated gas | After $H_2$-treatment |
|---|---|---|
| $CO_2$ | 50–60% | 50–60% |
| $O_2$ | 1–2% | 100–300 ppm |
| CO | 0.1–0.2 | 10–20 ppm |
| $N_2$ | 50–60% | 50–60% |
| NOx | 300 ppm | 10 ppm, |
| SOx | 0.01–0.02% | 3–5% |

<Embodiment 2>

A life waste water (sewage) in Tsukuba-City was treated. As the positive electrode plate, there was used one in which a TiO2 particles solution was partially applied to a surface of porous ceramics having a porosity of 30% such that its thickness became 2–3 mm, the ceramics are sintered at 500–600° C. after being dried, and the applied portion was made an electrode face.

The gas generated by the decomposition was caused to pass through the air and thereafter collected.

Results of the treatment during two months of November to December are shown in Table 4.

TABLE 4

| Flow rate ($m^3$/hr) | | TOC (mg/L) | T · N (mg/L) | T · p (mg/L) | SS (mg/L) |
|---|---|---|---|---|---|
| 0.60 | Original water | 13.2 ± 5.0 | 10.3 ± 3.8 | 1.0 ± 0.5 | 30 ± 8 |
|  | Treated water | 3.0 ± 1.0 | 1.5 ± 0.5 | 0.04 ± 0.01 | 2 ± 1 |
| 1.23 | Original water | 12.5 ± 5.0 | 10.1 ± 3.5 | 1.2 ± 0.6 | 32 ± 8 |
|  | Treated water | 2.5 ± 1.0 | 1.8 ± 0.8 | 0.08 ± 0.02 | 3 ± 1.5 |

TABLE 4-continued

| Flow rate (m³/hr) | TOC (mg/L) | T·N (mg/L) | T·p (mg/L) | SS (mg/L) |
|---|---|---|---|---|

Section: 50 cm × 75 cm
Water depth: 30 cm
Normal pressure: 5 kv, 10 kHz,
Duty ratio: 5%
Positive electrode: $TiO_2$
Negative electrode: Ti (Thickness 3 mm)

Also in a case where ruthenium oxide, cobalt oxide, nickel oxide and tin oxide were used in place of TiO2, approximately similar results were obtained.

As explained in detail above, by the invention, the effective elimination of the water pollution substances such as nitrogen and phosphorous, which has hitherto been difficult, to becomes possible, so that it is made possible to perform the purification of the flow such as a river with a high efficiency.

What is claimed is:

1. A purifying apparatus for purifying water flowing in a flowing direction over a flowing-water bed, comprising: a negative electrode plate to be disposed on the flowing-water bed; and a positive electrode plate to be disposed at an upper surface of the flowing water opposite to the negative electrode plate so as to have upstream and downstream end portions and opposing side portions with respect to the flowing direction of the water; said positive electrode plate being adapted so as to be dipped below the upper surface of the flowing water with floats being disposed at least at one of the upstream and downstream end portions of the positive electrode plate and the opposing side portions of the positive electrode plate; wherein structure is provided to position said positive electrode plate at a position of the upper surface of the flowing water opposite the negative electrode plate; and wherein said positive electrode plate and said negative electrode plate are provided with an electric field generator so that water pollution substances contained in the flowing water are oxidized and decomposed by a generation of high electric field pulses; and wherein said positive electrode plate has a concave curved face opposite to said negative electrode plate.

2. A purifying apparatus of claim 1, wherein the positive electrode plate is coupled to vertical-movement structure that allows for vertical movement of said positive electrode plate; and wherein said vertical-movement structure is provided with a differential transformer, thereby constituting a control mechanism for changing a voltage between faces of the positive electrode plate and the negative electrode plate between 200 V/cm and 10 KV/cm.

3. A purifying apparatus of claim 2, wherein there is provided an emergency evacuation unit for lifting up the vertical-movement structure in an upward direction by an oil pressure or an electric motor upon occurrence of an abnormal flow rate of the flowing water.

4. A purifying apparatus of claim 1, further comprising a gas collecting unit arranged at the downstream end portion of said positive electrode plate at an upper face side thereof.

5. A purifying apparatus of claim 4, wherein said gas collecting unit comprises a gas reservoir, and said gas reservoir is provided with a mechanism for sucking gas into the gas reservoir by a water pressure, a suction pump or a blower, mixing the gas with hydrogen gas by an electrolysis or hydrogen gas by a hydrogen bomb, and reducing the gas to N2 and water by a catalyst.

6. A purifying apparatus of claim 1, wherein said positive electrode plate is provided with a gas seal to seal against flow of gas therethrough.

7. A purifying apparatus of claim 6, wherein the gas seal is arranged on a face of said positive electrode plate that faces away from said negative electrode plate.

8. A purifying apparatus of claim 1, wherein a turbidity detector is provided at a location to be upstream of said positive electrode plate, thereby constituting an automatic control mechanism for changing an electric current value between 1 mA and 100 mA in compliance with the turbidity.

9. A purifying apparatus of claim 1, wherein a flow velocity meter is installed in the flowing water, thereby constituting an automatic control mechanism for changing a frequency between 10 kHz and 150 kHz based on the flow velocity.

10. A purifying apparatus of claim 1, wherein there is adjunctively provided, together with a unit for collecting and separating sediments generated by a suspension, a sedimentation tank decreasing the flow velocity in a rear of the unit in the flowing direction, or there is adjunctively provided a system in which a water flow is dammed and a part thereof is pumped up by a pump so as to be bypassed from the water flow and the sediments are deposited in a gravity sedimentation tank, and a supernatant liquid is returned to an original river.

11. A purifying method for flowing water, characterized in that the flowing water is treated by using an apparatus of claim 1.

12. A purifying apparatus for purifying water flowing in a flowing direction over a flowing-water bed, comprising: a negative electrode plate to be disposed on the flowing water bed; and a positive electrode plate to be disposed at an upper surface of the flowing water opposite to the negative electrode plate so as to have upstream and downstream end portions and opposing side portions with respect to the flowing direction of the water; said positive electrode plate being adapted so as to be dipped below the upper surface of the flowing water with floats being disposed at least at one of the upstream and downstream end portions of the positive electrode plate and the opposing side portions of the positive electrode plate; wherein structure is provided to position said positive electrode plate at a position of the upper surface of the flowing water opposite the negative electrode plate; and wherein said positive electrode plate and said negative electrode plate are provided with an electric field generator so that water pollution substances contained in the flowing water are oxidized and decomposed by a generation of high electric field pulses; and wherein a turbidity detector is provided at a location to be upstream of said positive electrode plate, thereby constituting an automatic control mechanism for changing an electric current value between 1 mA and 100 mA in compliance with the turbidity.

13. A purifying apparatus for purifying water flowing in a flowing direction over a flowing-water bed, comprising: a negative electrode plate to be disposed on the flowing water bed; and a positive electrode plate to be disposed at an upper surface of the flowing water opposite to the negative electrode plate so as to have upstream and downstream end portions and opposing side portions with respect to the flowing direction of the water; said positive electrode plate being adapted so as to be dipped below the upper surface of the flowing water with floats being disposed at least at one of the upstream and downstream end portions of the positive electrode plate and the opposing side portions of the positive electrode plate; wherein structure is provided to position said positive electrode plate at a position of the upper surface of the flowing water opposite the negative electrode plate; and wherein said positive electrode plate and said negative electrode plate are provided with an electric field generator so that water pollution substances contained in the flowing water are oxidized and decomposed by a generation of high electric field pulses; and wherein a flow velocity meter is installed in the flowing water, thereby constituting an automatic control mechanism for changing a frequency between 10 kHz and 150 kHz based on the flow velocity.

14. A purifying apparatus for purifying water flowing in a flowing direction over a flowing-water bed, comprising: a negative electrode plate to be disposed on the flowing water bed; and a positive electrode plate to be disposed at an upper surface of the flowing water opposite to the negative electrode plate so as to have upstream and downstream end portions and opposing side portions with respect to the flowing direction of the water; said positive electrode plate being adapted so as to be dipped below the upper surface of the flowing water with floats being disposed at least at one of the upstream and downstream end portions of the positive electrode plate and the opposing side portions of the positive electrode plate; wherein structure is provided to position said positive electrode plate at a position of the upper surface of the flowing water opposite the negative electrode plate; and wherein said positive electrode plate and said negative electrode plate are provided with an electric field generator so that water pollution substances contained in the flowing water are oxidized and decomposed by a generation of high electric field pulses; and wherein there is adjunctively provided, together with a unit for collecting and separating sediments generated by a suspension, a sedimentation tank decreasing the flow velocity in a rear of the unit in the flowing direction, or there is adjunctively provided a system in which a water flow is dammed and a part thereof is pumped up by a pump so as to be bypassed from the water flow and the sediments are deposited in a gravity sedimentation tank, and a supernatant liquid is returned to an original river.

\* \* \* \* \*